(12) United States Patent
Close

(10) Patent No.: US 8,045,744 B2
(45) Date of Patent: Oct. 25, 2011

(54) DOOR SPEAKER ENCLOSURE WITH INTEGRAL WATER BARRIER AND HARDWARE ATTACHMENT

(75) Inventor: Richard A. Close, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 805 days.

(21) Appl. No.: 12/136,969

(22) Filed: Jun. 11, 2008

(65) Prior Publication Data

US 2009/0310812 A1 Dec. 17, 2009

(51) Int. Cl.
*H04B 1/00* (2006.01)
*H04R 1/02* (2006.01)

(52) U.S. Cl. .............. 381/389; 381/86; 381/87

(58) Field of Classification Search .......... 381/86, 381/87, 302, 332, 386, 389; 181/141, 150, 181/199; 49/502; 296/146.7; 264/40.1
See application file for complete search history.

(56) References Cited

U.S. PATENT DOCUMENTS

| | | | |
|---|---|---|---|
| 5,535,553 A | 7/1996 | Staser et al. | |
| 6,226,927 B1 * | 5/2001 | Bertolini et al. | 49/502 |
| 6,367,202 B1 * | 4/2002 | Reed et al. | 49/502 |
| 7,237,825 B1 | 7/2007 | Tilli et al. | |
| 7,313,247 B1 | 12/2007 | Tilli et al. | |
| 2004/0264729 A1 | 12/2004 | Ito et al. | |
| 2007/0029836 A1 * | 2/2007 | DeWolfe et al. | 296/146.7 |
| 2008/0165998 A1 * | 7/2008 | LeClear et al. | 381/345 |

* cited by examiner

*Primary Examiner* — Tuan Nguyen
(74) *Attorney, Agent, or Firm* — Quinn Law Group, PLLC

(57) ABSTRACT

A door speaker box includes an enclosure member and speaker operatively attached thereto, such that they define an acoustic volume, into which the speaker communicates. The enclosure member and speaker are configured to be installed as a speaker box unit in the vehicle door, such that speaker box unit seals the door against moisture passage into the vehicle interior. A flange integrally formed in the enclosure member extends substantially around a portion thereof and is configured to seal against such moisture passage. A hardware mounting surface may be integrally formed in the enclosure member, and configured to receive and support a door hardware component. The flange may further define and enclose the acoustic volume, and may be configured to seal multiple access holes in the inner panel, such that the door is characterized by an absence of rain paper or other dedicated water barrier.

18 Claims, 3 Drawing Sheets

DOOR SPEAKER ENCLOSURE WITH INTEGRAL WATER BARRIER AND HARDWARE ATTACHMENT

TECHNICAL FIELD

This disclosure relates to enclosures for audio speakers in vehicle doors.

BACKGROUND OF THE INVENTION

Many vehicles employ side door assemblies having windows requiring operating hardware which is known as the window regulator. The window generally moves between a fully open position, in which it is substantially disposed within the door assembly and a fully closed position, in which the majority of the window is located above the belt line of the door assembly.

Additional hardware items also conventionally reside in or on a vehicle door and therefore, may need to be assembled into the door assembly with the window and regulator in a coordinated manner to avoid interference. A typical door system includes interior and exterior handles and a door latch for releasably holding the door in a closed position. Interior and exterior lock actuators are also often provided in the door assembly, which are operatively linked to the latch or handles to selectively prevent the handles from releasing the latch assembly to an open position.

The window assembly may reside in between an outer panel, which is part of the vehicle exterior, and an inner panel, which may provide structural integrity for the vehicle door. The inner panel often includes one or more service or access holes to facilitate installation of the window regulator and other door hardware components. These access holes may be sealed by rain paper to prevent water and moisture from entering the interior of the vehicle. Many vehicle doors also include a trim panel attached to the inner panel, which forms part of the vehicle interior exposed to the vehicle occupant.

A speaker which is part of the vehicle audio system may also be mounted in the vehicle side door. The speaker converts an electrical signal from the radio or amplifier into audible sound waves in the form of music, information, or notification signals from the vehicle's operating system.

SUMMARY

A speaker box for use in a vehicle door is provided, including an enclosure member and a speaker operatively attached to the enclosure member. The enclosure member and speaker cooperate to enclose and define an acoustic volume, into which a portion of the speaker extends or communicates. The enclosure member and speaker are configured to be installed as a speaker box unit in the vehicle door, and the speaker box unit is configured to seal the vehicle door against passage of moisture into the vehicle interior.

The speaker box may further include a flange integrally formed in the enclosure member and extending substantially around a portion thereof, such that the flange is configured to provide the seal against such moisture passage. A hardware mounting surface may be integrally formed in the enclosure member, and configured to receive and support a door hardware component, such as a lock rod, a latch rod, a window control unit, a door handle, a door lock module, a wiring harness, a window regulator, and a seal.

The flange may further define and enclose the acoustic volume, such that the acoustic volume is increased relative to a flat flange. The speaker may be a subwoofer and the speaker box unit configured to produce bass frequencies.

The flange may be configured to seal one access hole or to seal multiple access holes in the inner panel of the door. The speaker box may seal all access holes in the door such that the door is characterized by an absence of rain paper or other dedicated water barrier.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
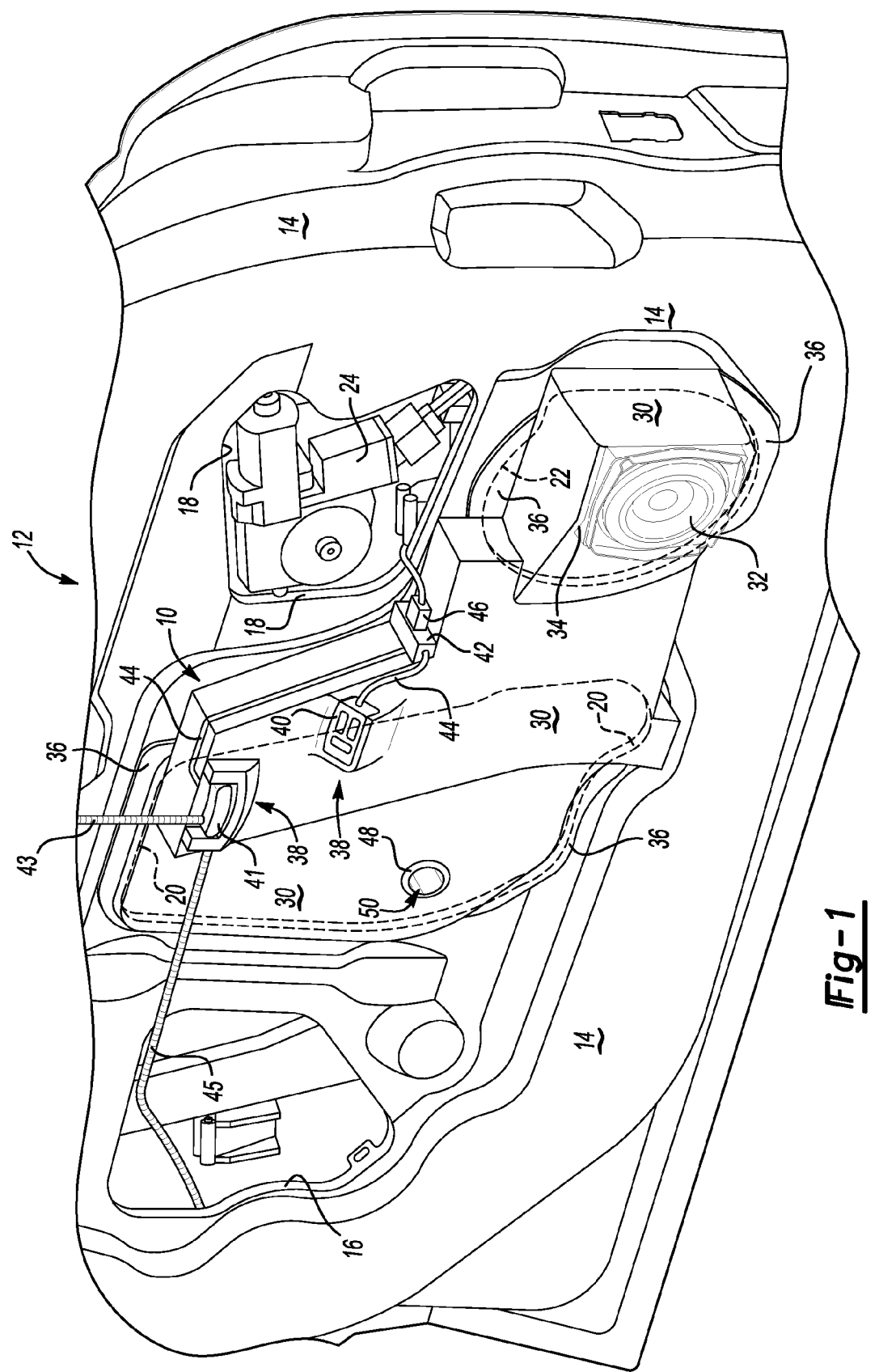
FIG. 1 is a schematic perspective view of a door speaker enclosure attached to a portion of an inner door panel, as viewed from the vehicle interior.

Referring to the drawings, wherein like reference numbers correspond to like or similar components throughout the several figures, there is shown in FIG. 1 an embodiment of a door speaker box 10 of a door 12. Speaker box 10 is mated to an inner panel 14 of the door 12. The inner panel 14 would be mated to an outer panel (not shown, inner and outer are denoted with respect to the interior and exterior of the assembled vehicle) and a trim panel (not shown) before or concurrently with assembly of the door 12 into the vehicle. The door 12 shown in FIG. 1 is a left (driver) side door, as would be viewed from the inside or interior of the vehicle (when installed).

The inner panel 14 provides structural support for door 12, and is typically made from a stamped drawn sheet metal, but may be made of any suitable material known to those having ordinary skill in the art. In the embodiment shown in FIG. 1, inner panel 14 has four access holes, 16, 18, 20 and 22. Speaker box 10 covers the access holes 20 and 22, which are shown in phantom in FIG. 1.

Access holes 16, 18, 20, and 22 provide clearance for assembly of door components and hardware such as a window regulator 24. Each of the access holes 16-22 generally requires some form of water barrier, such as rain paper, to ensure that moisture does not pass through the access holes into the passenger compartment.

As viewed in FIG. 1, speaker box 10 includes an enclosure 30 and a speaker 32. The enclosure 30 may be a one or two-piece, hollow, molded plastic enclosure, having an internal acoustic volume 50 (viewable through a reflex port 48, and similar to volume shown at 150 in FIG. 2B and 250 in FIG. 3B). Those having ordinary skill in the art will recognize other materials from which the enclosure 30 could be made, and will further recognize that enclosure shape, material and acoustic volume 50 play a role in sound production.

Speaker enclosure 30 has a speaker mounting hole 34, into which speaker 32 is installed, such that a portion of speaker 32 cooperates with the acoustic volume 50. In this embodiment, the speaker 32 is facing inward, toward the passenger compartment. Speaker enclosure 30 and speaker 32 cooperate to enclose and define the acoustic volume 50. Those having ordinary skill in the art will recognize that the size, shape, and configuration of the acoustic volume 50 affects the sound produced by speaker 32, and that the enclosure 30 may be designed and tuned to produce specific audio effects or frequency ranges.

Typically the speaker box 10 and enclosure 30 are designed to produce lower frequencies or bass tones and is known as a subwoofer. However, as will be recognized by those having ordinary skill in the art, speaker 32 could also be a mid-range speaker, a tweeter (high frequency), or another speaker type. Furthermore, speaker box 10 could include multiple speakers 32.

Those having ordinary skill in art will recognize that enclosure 30 and speaker 32 may completely close the acoustic volume 50, or that a reflex port 48 may be incorporated into the enclosure 30. In a closed-box embodiment (such as those shown in FIGS. 2A and 3A, or the enclosure 30 shown in FIG. 1 but without a port 48) the mass of air inside of the enclosure 30 is constant and the air therefore acts as a spring as the cone of speaker 32 moves in and out of the enclosure 30. A ported enclosure 30 would allow air in the acoustic volume 50 to communicate with outside air through the port 48.

In embodiments utilizing a reflex port, such as that shown in FIG. 1, the port generally consists of one or more tubes mounted on the front or the rear side (relative to the orientation of the speaker) of the enclosure 30. This extends the frequency response of the system, which may mean that the speaker 32 can reproduce the sound of musical instruments that generate low frequency (bass) in a better way than that of an equally sized sealed enclosure. Generally, reflex ports (48) are tuned by their area and length, which affect the mass and motion of the air within the port 48 and enclosure 30 and the behavior of the sound produced.

Many vehicle doors occasionally allow small amounts of water or moisture to enter the area in between the outer and inner panels of the door. This may be damaging if the door 12 does not have mechanisms to prevent moisture from entering the vehicle interior. Access holes (16, 18, 20, and 22) and other openings in the inner panel 14 are therefore sealed against moisture. This may be done with rain paper or other dedicated sealing components. The speaker box 10, however, includes features configured to seal door 12 against passage of moisture entering the vehicle interior or passenger compartment. Furthermore, speaker box 10 seals inner panel 14 without the use of rain paper or other dedicated sealing components, which may simplify assembly procedures for door 12.

In this embodiment, speaker enclosure 30 covers both of the access holes 20 and 22. Along the periphery of the portions of enclosure 30 adjacent to access holes 20 and 22 are flanges 36, which are generally complementary to the shape of access holes 20 and 22. The flanges 36 of speaker box 10 seal the access holes 20 and 22 against passage of moisture into the passenger compartment from outside of the inner panel 14, thereby removing the need for any additional water barrier, such as rain paper sheets.

Those having ordinary skill in the art will recognize that, in other embodiments, portions of the sealing flange 36 could also be extended to cover the access hole 18 for the window regulator 24. Depending upon the size of speaker enclosure 30 and the amount of acoustic volume 50 desired, the flanges 36 may be thin and substantially flat or may be a three-dimensional boss and incorporate additional acoustic volume 50.

Flanges 36 may be self-sealing when installed against access holes 20 and 22, or may be configured to accept a sealing material placed in between flanges 36 and inner panel 14. Possible sealing materials include, without limitation, foam gaskets, rubber or plastic seals, spray foam, or any other substance known to those having ordinary skill in the art as capable of forming a moisture barrier between the inner panel 14 and trim panel—and therefore the vehicle interior or passenger compartment.

As shown in FIG. 1, this embodiment of the speaker box 10 further includes hardware mounting surfaces 38. One hardware mounting surface 38 is configured to receive a window control unit 40 and another is configured to receive a door handle 41, a lock rod 43, and a latch rod 45.

The hardware mounting surfaces 38 are integrally molded or formed into enclosure 30. Integrally formed hardware mounting surfaces 38 allow the option of installing window control unit 40 and/or door handle 41 (and associated components) onto the speaker box 10 prior to assembling door 12. Pre-assembly installation of door hardware components may simplify the final assembly process for door 12.

Additional hardware mounting surfaces 38 could be molded into enclosure 30 for attachment or mounting of other hardware components to the speaker box 10, such as, without limitation: door latches, lock modules, or other hardware components known to those having ordinary skill in the art. By incorporating multiple hardware mounting surfaces 38 and hardware components, much of the hardware for the door 12 can be installed onto speaker box 10 prior to assembly of the door, and then all of the hardware components can be installed—along with the speaker—in a single step.

Window control unit 40 is connected to a harness 42 via wires 44. The harness 42 is operatively connected to the vehicle's power supply and to the window regulator 24. In the embodiment shown, this connection is made with a plug 46. As will be recognized by those having ordinary skill in the art, harness 42 could be further connected to other hardware components (and their associated systems) installed on, or adjacent to, speaker box 10, such as the speaker 32. Harness 42 and plug 46 may further simplify assembly of door 12 by providing simplified connection points for multiple hardware components.

Figure 2A:
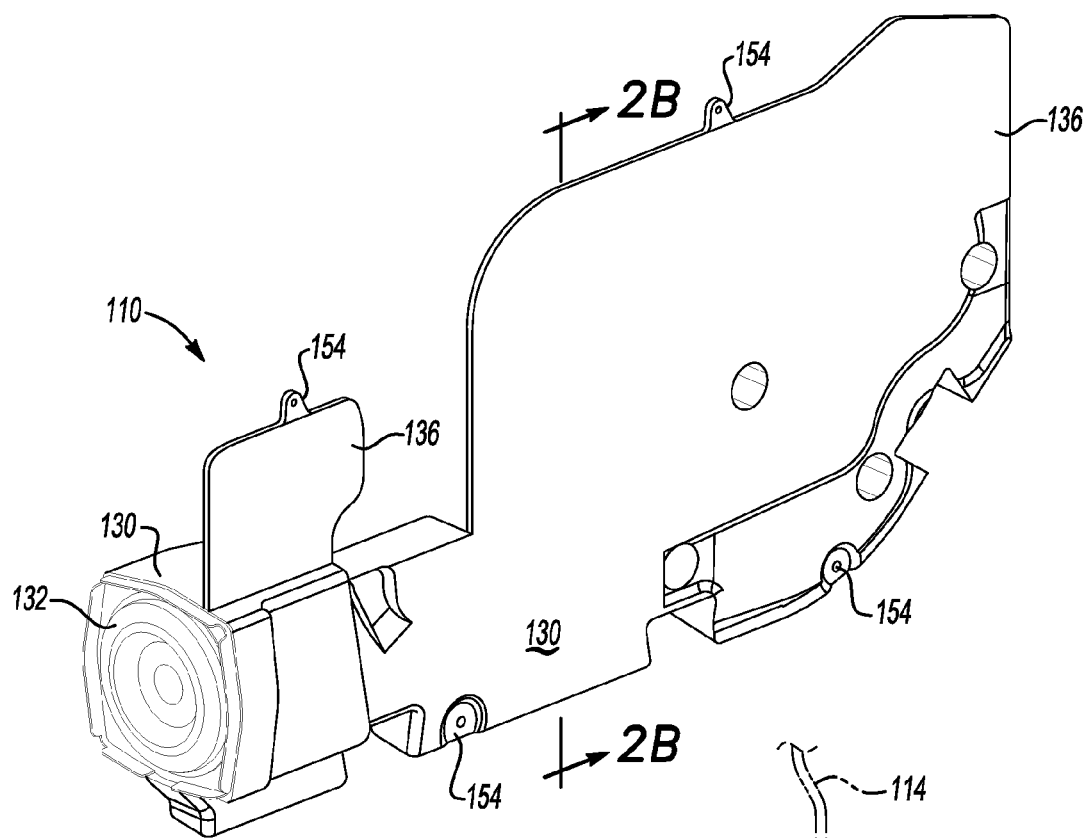
FIG. 2A is a schematic perspective view of another embodiment of door speaker enclosure.
Figure 2B:
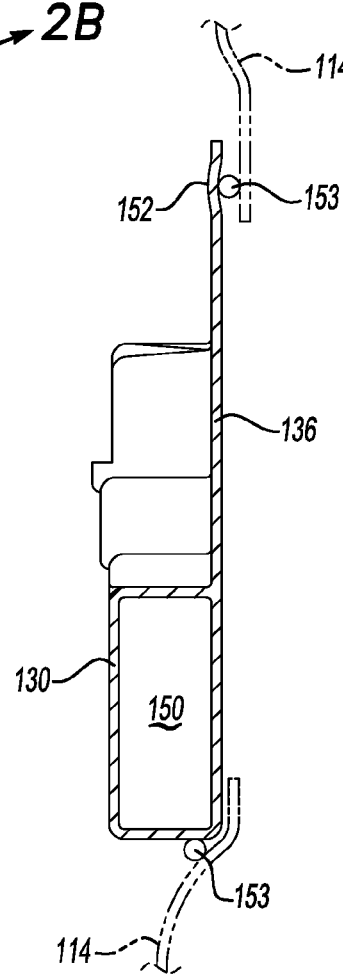
FIG. 2B is a cross section of the door speaker enclosure of FIG. 2A, taken along line 2B-2B of FIG. 2A.

FIGS. 2A and 2B show an alternative embodiment of a door speaker box 110. This embodiment is configured for incorporation into a left (driver) side door (not shown) similar to the door 12 shown in FIG. 1. Speaker box 110 may be installed into an inner panel 114 (not shown in FIG. 2A, shown in phantom in FIG. 2B) similar to the inner panel 14 shown in FIG. 1, but having differently shaped and located access holes.

Speaker box 110 includes an enclosure 130 and a speaker 132. The speaker enclosure 130 is similar to the enclosure 30 of FIG. 1. Speaker enclosure 130 and speaker 132 enclose and define an internal acoustic volume 150. The speaker 132 is oriented to face forward, unlike speaker 32 of FIG. 1, which faced the vehicle's passenger compartment.

Speaker box 110 includes two flanges 136 which are shaped to cover access holes in the inner panel when speaker enclosure is installed in a door. As best viewed in FIG. 2B, which is a cross section of speaker box 110 taken along plane 2B-2B, flanges 136 are generally flat extensions of enclosure 130. These flanges are on the outside of enclosure 130, but may be located on the inside or middle of the enclosure, depending upon the relative placement of speaker box 110 on its inner panel.

In this embodiment, along the outer edge of flanges 136, and shown at the top of FIG. 2B, is a sealing lip 152. The sealing lip 152 may facilitate sealing of the periphery of flanges 136 by acting as a receptacle for sealant or as an interface surface for a sealing gasket 153 which is inserted between inner panel 114 and flanges 136. As will be recognized by those having ordinary skill in the art, the sealing lip 152 could have numerous other shapes and configurations, while still sealing the inner panel against moisture.

Speaker box 110 further includes attachment features 154. Used as an alternative to clamps or as an alternative to relying solely on gripping force provided by an adhesive sealant, the attachment features 154 cooperate directly, or through bolts or other hardware, to secure speaker box 110 to the inner panel 114. Those having ordinary skill in the art will recognize myriad attachment features capable of holding speaker box 110 to inner panel 114 while sealing covered access holes against moisture, such as, without limitation: mounting tabs or mounting holes.

Figure 3A:
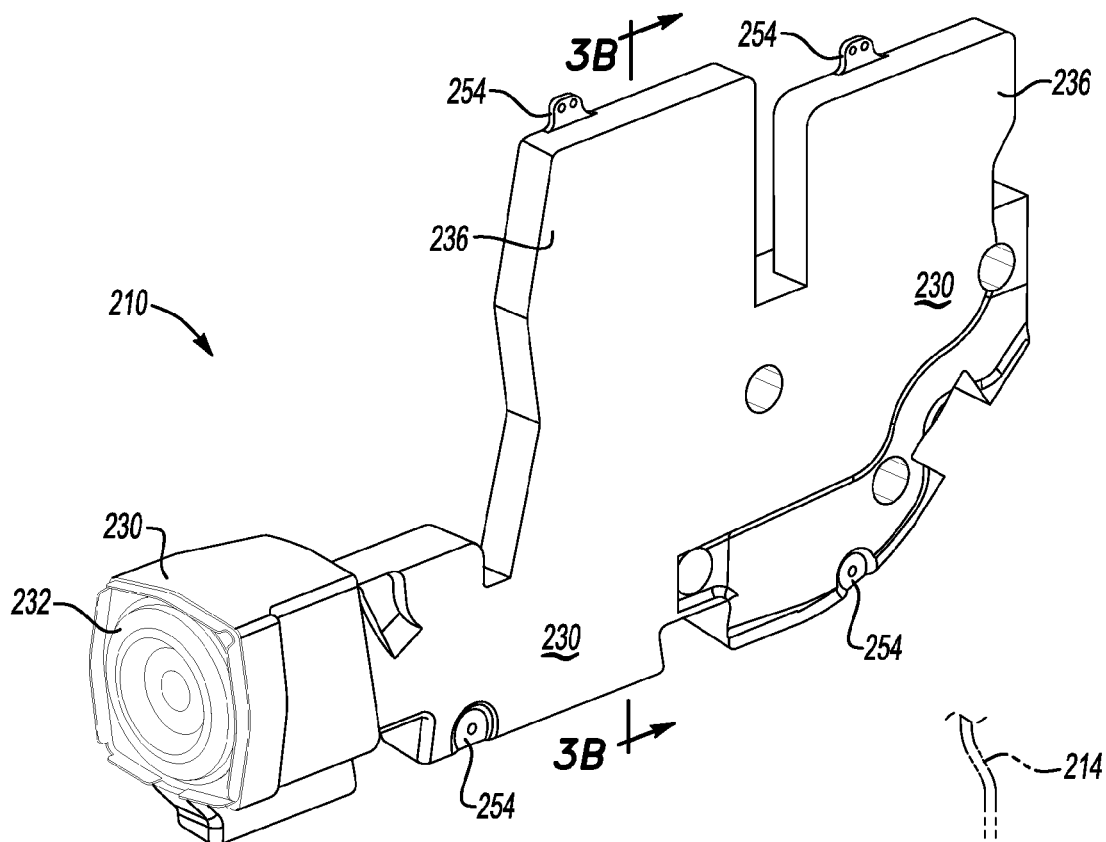
FIG. 3A is a schematic perspective view of another embodiment of door speaker enclosure.
Figure 3B:
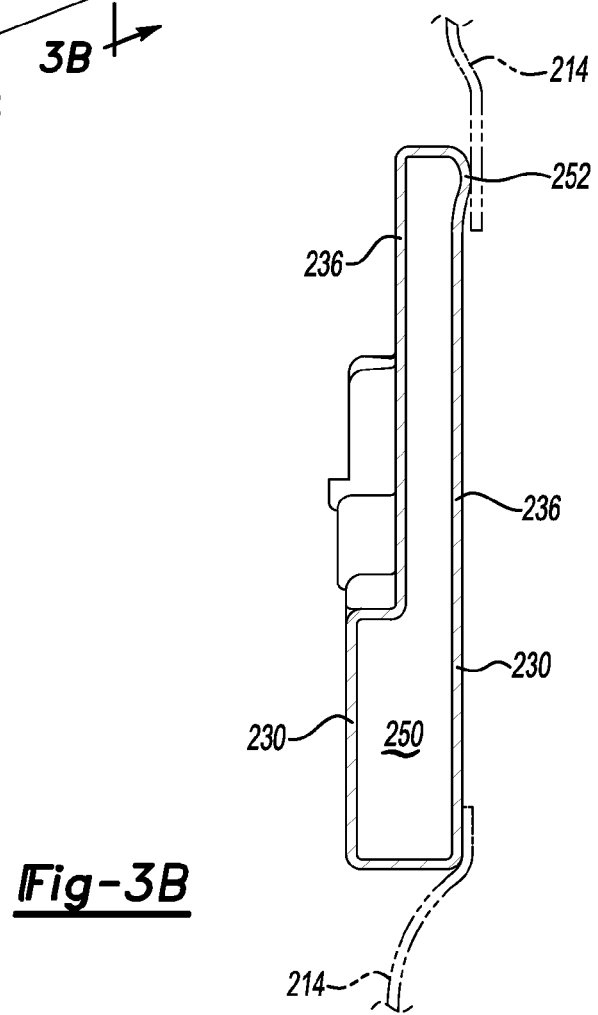
FIG. 3B is a cross section of the door speaker enclosure of FIG. 3A, taken along line 3B-3B of FIG. 3A.

FIGS. 3A and 3B show another embodiment of a door speaker enclosure 210. The speaker enclosure 210 is similar to speaker box 110 of FIGS. 2A and 2B, and has an enclosure 230 and a forwardly-oriented speaker 232. However, the flanges 236 are configured to complement and seal different access holes. Additionally, as shown in FIG. 3B, the flanges 236 are three-dimensional and further define the acoustic volume 250, which yields a larger acoustic volume 250 than comparably shaped flat flanges 236.

Referring to FIG. 3B, which is a cross section taken along section plane 3B-3B of the speaker enclosure 210 shown in FIG. 3A, there is shown another embodiment of a sealing lip 252. Unlike the sealing lip 152 shown in FIG. 2B, the sealing lip 252 is a convex protrusion in the wall of the flange 236.

Like sealing lip 152, sealing lip 252 could act as receptacle for sealant or as an interface surface for a gasket (not shown). Furthermore, the sealing lip 252 could self-seal against an inner panel 214 (shown in phantom in FIG. 3B) when pressed or clamped with enough force to flex the convex portion inward. Speaker enclosure 210 also includes attachment features 254, which may be used for attachment to the inner panel.

As will be recognized by those having ordinary skill in the art, the sealing function of the speaker enclosures 10, 110, and 210 may be further enhanced by incorporation of sealing surfaces into the respective inner panels (14, 114, and 214). For example, incorporation of a convex sealing surface complementary to sealing lip 252 may assist in allowing the speaker enclosure 210 to self-seal against the inner panel 214 without the use of sealants or gaskets. Furthermore, incorporation of a sealing surface onto the inner panel (14, 114, or 214) may enhance cooperation with a foam gasket (such as 153 in FIG. 2B) or other sealing material.

While the best modes and other embodiments for carrying out the invention have been described in detail, those familiar with the art to which this invention relates will recognize various alternative designs and embodiments for practicing the invention within the scope of the appended claims.

The invention claimed is:

1. A speaker box for use in a vehicle door, comprising:
an enclosure member;
a speaker operatively attached to said enclosure member, such that said enclosure member and said speaker cooperate to enclose and define an acoustic volume, wherein a portion of said speaker is in communication with said acoustic volume; and
wherein said enclosure member and said speaker are configured to be installed as a speaker box unit in the vehicle door, and said speaker box unit is configured to seal the vehicle door against moisture passage.

2. The speaker box of claim 1, further comprising:
a flange integrally formed in said enclosure member and extending substantially around a portion of said enclosure member, such that said flange is configured to seal the vehicle door against such moisture passage.

3. The speaker box of claim 2, further comprising:
a hardware mounting surface integrally formed in said enclosure member, wherein said hardware mounting surface is configured to receive and support a door hardware component.

4. The speaker box of claim 3, wherein the door hardware component receivable by said hardware mounting surface comprises one of a lock rod, a latch rod, a window control unit, a door handle, a door lock module, a wiring harness, a window regulator, and a seal.

5. The speaker box of claim 4, wherein said flange further defines said acoustic volume.

6. The speaker box of claim 2, wherein said flange further defines said acoustic volume.

7. The speaker box of claim 6, wherein said speaker is a subwoofer and said speaker box unit is configured to produce bass frequencies.

8. A vehicle door, comprising:
an inner panel having a first access hole;
an enclosure member including a first integral boss portion having a periphery substantially complementary to said first access hole;
a speaker operatively attached to said enclosure member, such that said enclosure member and said speaker cooperate to enclose and define an acoustic volume, wherein a portion of said speaker extends into said acoustic volume; and
wherein said enclosure member is configured to seal said first access hole against moisture passage.

9. The vehicle door of claim 8, wherein said first integral boss portion further defines said acoustic volume.

10. The vehicle door of claim 9, further comprising:
a hardware component; and
a hardware mounting surface integrally formed in said enclosure member, wherein said hardware mounting surface is configured to receive and support said hardware component.

11. The vehicle door of claim 10, wherein said hardware component comprises one of a lock rod, a latch rod, a window control unit, a door handle, a door lock module, a wiring harness, a window regulator, and a seal.

12. The vehicle door of claim 11, further comprising:
a second access hole in said inner panel;
wherein said enclosure member further includes a second integral boss portion having a periphery substantially complementary to said second access hole;
wherein said enclosure member is further configured to seal said second access hole against moisture passage.

13. The vehicle door of claim 12, wherein said second integral boss portion further encloses and defines said acoustic volume.

14. The vehicle door of claim 13, wherein the vehicle door is characterized by the absence of a rain paper seal.

15. The vehicle door of claim 8, further comprising:
a second access hole in said inner panel;
wherein said enclosure member further includes a second integral boss portion having a periphery substantially complementary to said second access hole;
wherein said enclosure member is further configured to seal said second access hole against moisture passage.

16. The vehicle door of claim 15, wherein said second integral boss portion further encloses and defines said acoustic volume.

17. The vehicle door of claim 16, further comprising:
a hardware mounting surface integrally formed in said enclosure member, wherein said hardware mounting surface is configured to receive and support a hardware component of the vehicle door.

18. The vehicle door of claim 17, wherein the vehicle door is characterized by the absence of a rain paper seal.

* * * * *